(12) United States Patent
Lu et al.

(10) Patent No.: US 11,550,408 B1
(45) Date of Patent: Jan. 10, 2023

(54) ELECTRONIC DEVICE WITH OPTICAL SENSOR FOR SAMPLING SURFACES

(71) Applicant: Apple Inc., Cupertino, CA (US)

(72) Inventors: Jean Hsiang-Chun Lu, Sunnyvale, CA (US); Bosheng Zhang, Sunnyvale, CA (US); Kathrin Berkner Cieslicki, Los Altos, CA (US); Manohar B. Srikanth, Mountain View, CA (US); Noah D. Bedard, Los Gatos, CA (US); Ting Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/361,144

(22) Filed: Jun. 28, 2021

(51) Int. Cl.
*G06F 3/041* (2006.01)
*G06F 3/0354* (2013.01)
*G06F 3/042* (2006.01)

(52) U.S. Cl.
CPC ........ G06F 3/03545 (2013.01); G06F 3/0421 (2013.01)

(58) Field of Classification Search
CPC .................... G06F 3/03545; G06F 3/0421
See application file for complete search history.

(56) References Cited

U.S. PATENT DOCUMENTS

| 6,377,249 | B1 | 4/2002 | Mumford |
| 9,323,348 | B2 | 4/2016 | Nungester et al. |
| 9,665,187 | B2 | 5/2017 | Shu |
| 10,694,607 | B1 | 6/2020 | Xu et al. |
| 10,976,838 | B2 | 4/2021 | Ivanov |
| 11,126,281 | B2 | 9/2021 | Lewty et al. |
| 2010/0128064 | A1* | 5/2010 | Taylor .................. G09G 3/3413 345/83 |
| 2012/0331546 | A1 | 12/2012 | Falkenburg et al. |
| 2014/0152576 | A1 | 6/2014 | Kim et al. |
| 2015/0206506 | A1* | 7/2015 | Lee ........................ G06F 3/0488 345/592 |
| 2015/0212602 | A1* | 7/2015 | Lor .......................... G06F 3/048 345/175 |
| 2016/0034052 | A1 | 2/2016 | Shu |

(Continued)

FOREIGN PATENT DOCUMENTS

| CN | 106249921 A | 12/2016 |
| KR | 20200071287 A | 6/2020 |

*Primary Examiner* — Patrick N Edouard
*Assistant Examiner* — Joseph P Fox
(74) *Attorney, Agent, or Firm* — Treyz Law Group, P.C.; G. Victor Treyz; David K. Cole

(57) ABSTRACT

A device such as a stylus may have a color sensor. The color sensor may have a color sensing light detector having a plurality of photodetectors each of which measures light for a different respective color channel. The color sensor may also have a light emitter. The light emitter may have an adjustable light spectrum. The light spectrum may be adjusted during color sensing measurements using information such as ambient light color measurements made with a color ambient light sensor that has a plurality of photodetectors each of which measures light for a different respective color channel. An inertial measurement unit may be used to measure the angular orientation between the stylus and an external object during color measurements. Arrangements in which the light emitter is modulated during color sensing may also be used. Measurements from the stylus may be transmitted wirelessly to external equipment.

29 Claims, 11 Drawing Sheets

(56) References Cited

U.S. PATENT DOCUMENTS

| | | |
|---|---|---|
| 2016/0334891 A1 | 11/2016 | Ozoemenam et al. |
| 2016/0357343 A1 | 12/2016 | Falkenburg et al. |
| 2017/0308015 A1* | 10/2017 | Nakase .............. G03G 15/1605 |
| 2018/0081456 A1* | 3/2018 | Li ........................ G06F 3/0383 |
| 2019/0290148 A1 | 9/2019 | Kang et al. |
| 2020/0103988 A1 | 4/2020 | Jeon et al. |
| 2020/0168120 A1* | 5/2020 | Rodriguez Bravo .... G09B 5/06 |
| 2020/0225778 A1 | 7/2020 | Lewty et al. |
| 2021/0041288 A1 | 2/2021 | Hung et al. |
| 2021/0124432 A1* | 4/2021 | Nicholson ............. G01J 1/0233 |
| 2021/0290046 A1* | 9/2021 | Nazareth ............ H04N 5/23293 |

* cited by examiner

ELECTRONIC DEVICE WITH OPTICAL SENSOR FOR SAMPLING SURFACES

FIELD

This relates generally to electronic systems, and, more particularly, to systems with electronic devices such as stylus devices.

BACKGROUND

Electronic devices such as computers can be controlled using computer mice and other input accessories. Some devices, such as tablet computers have touch sensitive displays. An input device such as a computer stylus may be used to interact with a touch sensitive display. For example, a user of a stylus may draw on the display.

SUMMARY

A device such as a stylus may have a color sensor. The color sensor may be used to sample the color of the surface of an external object. Texture measurements and/or other measurements on the appearance of the object may also be made. Measurements from the stylus may be transmitted wirelessly to a companion device such as a tablet computer (e.g., so that a sampled color or other attributes may be used in a drawing program or other software).

The color sensor may have a color sensing light detector having a plurality of photodetectors each of which measures light for a different respective color channel. The color sensor may also have a light emitter. The light emitter may have an adjustable light spectrum. The light spectrum may be adjusted during color sensing measurements using information such as ambient light color measurements. Arrangements in which the intensity of the light emitter is modulated during color sensing may also be used.

An inertial measurement unit may be used to measure the angular orientation between the stylus and an external object during color measurements. Texture may be measured using light that strikes the surface of the external object at glancing angles. Measurements from the stylus such as color sensor measurements, texture measurements, and associated angular orientation measurements may be transmitted wirelessly to external equipment.

DETAILED DESCRIPTION

Computer systems and other systems may use input-output devices to gather user input. For example, a computer stylus, which may sometimes be referred to as a digital pencil, electronic pen, stylus device, etc., may be used to draw on a touch screen in a tablet computer. A computer stylus may also be used to draw on drawing pad surfaces that do not contain displays. Input-output devices such as these may interact wirelessly with external equipment. For example, a computer stylus may use one or more electrodes located at the tip of the stylus to generate alternating-current (AC) electromagnetic signals that are detected by a capacitive touch sensor in a tablet computer (e.g., to determine the position of the tip of the device relative to the touch sensor) and may use a wireless local connection such as a Bluetooth® link or other wireless communications link to convey information between the input-output device and the tablet computer. If desired, a computer stylus may have wireless power receiving circuitry that allows a battery in the computer stylus to be wirelessly charged (e.g., using inductive charging).

Figure 1:
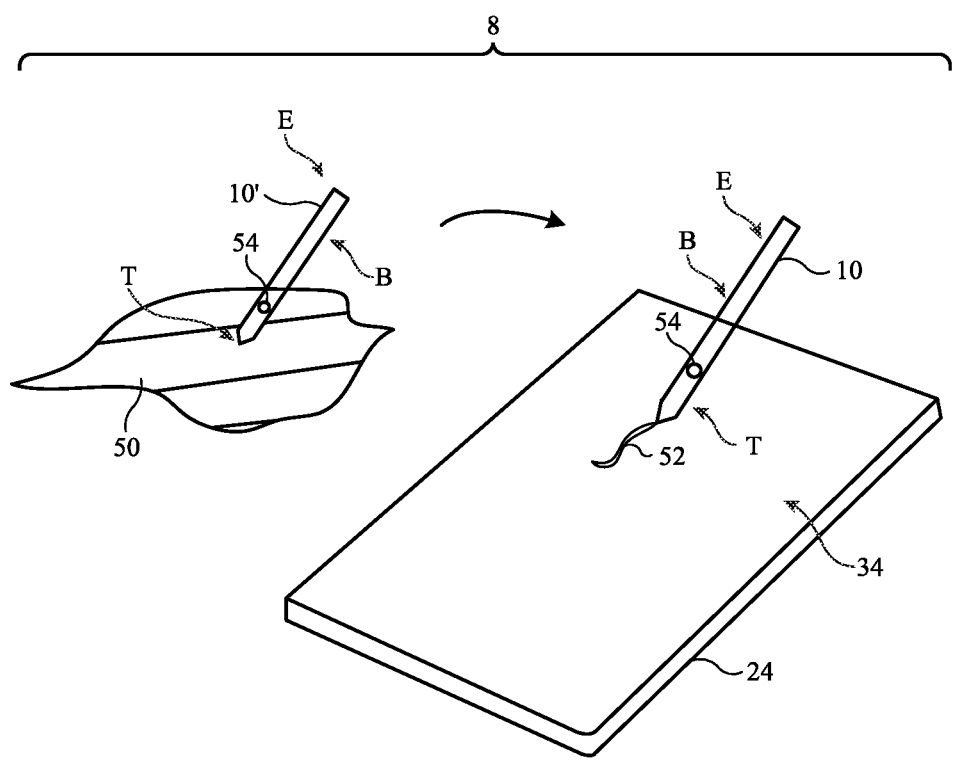
FIG. 1 is a perspective view of an illustrative system with electronic devices in accordance with an embodiment.

An illustrative system with an input device such as a computer stylus is shown in FIG. 1. As shown in FIG. 1, system 8 may include an input device such as device 10 (e.g., a computer stylus) and additional electronic equipment such as device 24 (e.g., a tablet computer, cellular telephone, or other device with a display). Display 34 of device 24 may be touch sensitive. For example, display 34 may include a two-dimensional capacitive touch sensor array that overlaps an array of pixels configured to display an image. Electrodes at tip T of device 10 may emit electromagnetic signals that are detected by the touch sensor of display 34. This allows tip T to be used to draw on-screen items such as line 52 on screen 34 (e.g., using a drawing program or other software running on device 24). Signals from tip T may also be used to make menu selections, to manipulate visual content displayed on other devices in system 8, and/or may otherwise be used to provide computer stylus input to system 8. Device 10 may include wireless circuitry for communicating with corresponding wireless communications circuitry in device 24 (e.g., over a Bluetooth® link or other wireless link). Using this wireless link, device 10 may, for example, convey sensor measurements from device 10 to device 24 to control device 24 or may otherwise supply input to system 8.

Device 10 may have an elongated housing that forms a computer stylus shaft or may have other suitable housing structures. Device 10 of FIG. 1 may include a color sensor or other optical sensor such as optical sensor 54. Sensor 54 may be used to measure the color and other optical characteristics of target objects such as object 50 (e.g., sensor 54 may measure texture, reflectance, color coordinates, and/or other optical properties of the surface of object 50). To make measurements, sensor 54 includes a color-sensitive light detector. A color-sensing light detector may have multiple photodetectors each of which is sensitive to light in a different band of wavelengths. Sensor 54 may also include an optional illumination system for illuminating object 50.

Sensor 54 may be used in devices such as computer styluses that serve as tablet computer writing instruments or may be used in pencil-shaped devices or other devices that are not capable of supplying writing input to a tablet (e.g., stand-alone styluses or other electronic devices that are not used for writing on the surface of a tablet computer). Illustrative configurations in which device 10 is a computer stylus are sometimes described herein as an example.

Sensor 54 may be located at tip T of device 10, at opposing end E of device 10, and/or elsewhere in device 10 such as at a location along shaft B of device 10. Shaft B, which may sometimes be referred to as a cylindrical housing, may form an elongated main body portion of the housing of device 10 that extends between tip T and end E. End E may sometimes be referred to as a cap. Tip T may sometimes be referred to as a writing tip, pointed tip, etc. In configurations in which sensor 54 is located at tip T or end E, sensor 54 may emit light and measure light locally. In configurations in which sensor 54 is not located at tip T or end E, sensor 54 may use optical waveguides or other structures to guide emitted light from sensor 54 to tip T (or to end E) and may use these optical waveguides or other structures to guide sampled light from tip T (or end E) to sensor 54. Arrangements in which sensor 54 is located in shaft B and in which light guiding structures extend between sensor 54 and tip T are sometimes described herein as an example.

During color sampling operations, device 10 can use sensor 54 to measure the color and other optical characteristics of an item. For example, device 10 can be placed so that tip T is adjacent to real-world object 50 as shown by illustrative device 10' of FIG. 1. In this location, sensor 54 can be used to measure the color of object 50 and can optionally measure other optical characteristics such as surface texture, surface reflectivity. If desired, sensor 54 can measure color, reflectivity, and/or other optical properties as a function of angular orientation between device 10 and object 50. Color measurements may be represented using color coordinates. Sampled color information and/or other sampled optical characteristics of the surface of real-world object 50 (texture, reflectivity, angular orientation information during sampling, etc.) can then be conveyed wirelessly to device 24. Arrangements in which color samples are conveyed to device 24 may sometimes be described herein as an example. In general, any optically sampled surface characteristics of a target object and associated data can be conveyed to device 24.

Device 24 can use a sampled color (or other sampled surface characteristic) from sensor 54 when new content is being drawn on display 34. For example, a measured color can be placed in a color palette in a drawing program. A user of device 10 can then assign the color to a brush in a drawing program and can draw lines such as line 52 or other items using this color. Device 10, device 24, and/or other equipment in system 8 (e.g., a remote server and/or other electronic equipment) can also use measured colors for calibrating displays, calibrating printers, making health-related measurements, identifying paint colors (e.g., when attempting to identify a color of paint to match an existing painted object), identifying colors for home applications or other applications (e.g., selecting cosmetics), identifying food attributes, identifying colors associated with art and design projects, etc.

Figure 2:
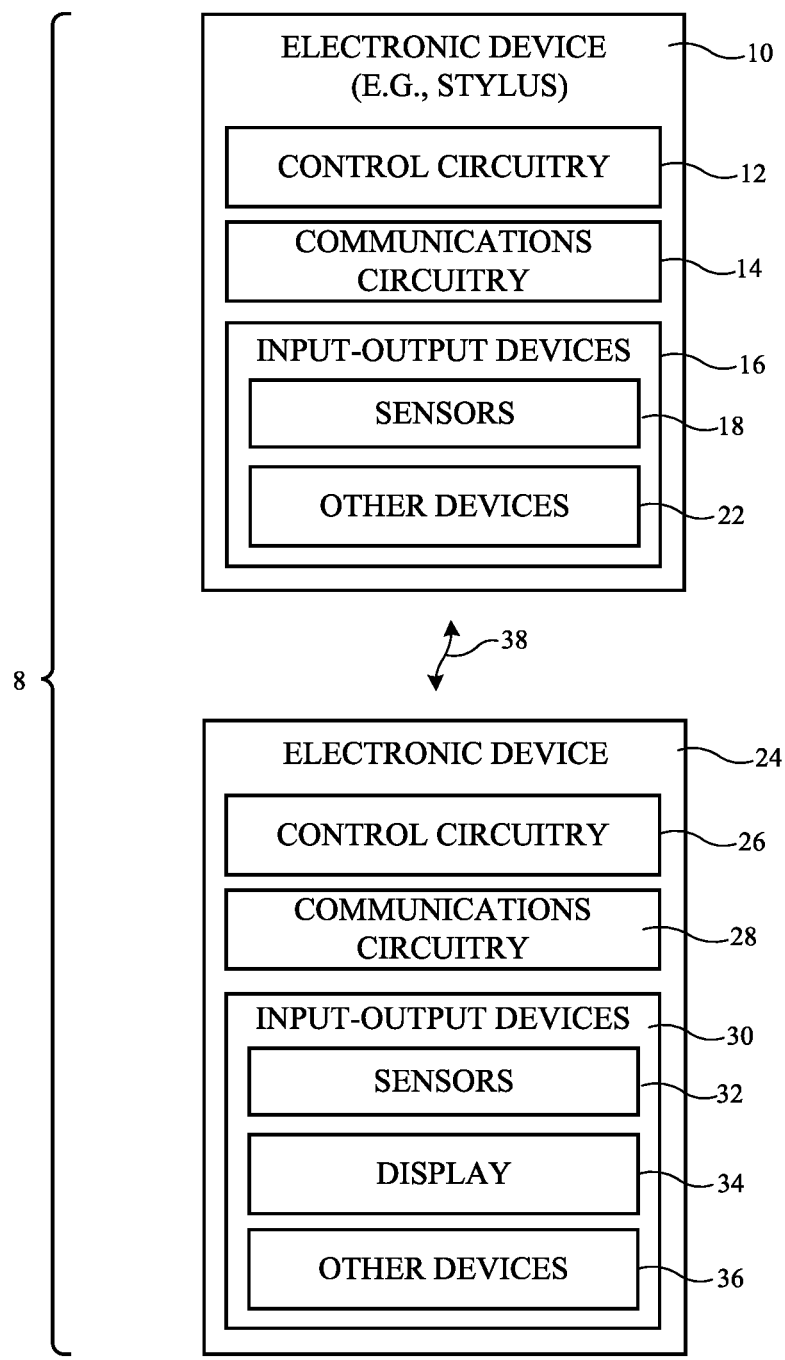
FIG. 2 is a schematic diagram of an illustrative system in accordance with an embodiment.

A schematic diagram of illustrative electronic devices in system 8 is shown in FIG. 2. As shown in FIG. 2, system 8 may include one or more electronic devices such as a computer stylus (e.g., device 10) that are used in gathering user input and that are used in gathering color measurements. System 8 may also include one or more electronic devices such as electronic device 24 that can be controlled using user input gathered by device(s) 10 and that can use color measurements, texture measurements, and/or other optically measured surface characteristics gathered by device(s) 10. There may, in general, be one or more devices 10 in system 8 and one or more devices 24 in system 8. Illustrative configurations in which system 8 includes a single electronic device 10 (e.g., a single computer stylus or other stylus) and a single device 24 that is controlled by device 10 (e.g., an electronic device with a touch screen display) may sometimes be described herein as an example.

Device 10 may gather user input (and optionally provide haptic output, visual output, audio output and/or other output) and may therefore sometimes be referred to as user input device (or input-output device). The user input that is gathered by device 10 may include information on the position of device 10 (e.g., motion and orientation information gathered using an inertial measurement unit or other position sensor). Sensor input such as color readings may also be gathered by device 10. The position of tip T of device 10 relative to display 34 of device 24 may be determined by using electrodes in device 10 to transmit electromagnetic signals (e.g., alternating-current signals) while using a touch sensor formed from an array of capacitive touch sensor electrodes in display 34 to detect and monitor the location of the transmitted signals from tip T. In this way, tip T can be tracked in system 8 as tip T is moved across the surface of display 34.

Device 24 may include display 34 and may therefore sometimes be referred to as an output device or visual output device. During operation of system 8, color sensor measurements and other measurements from sensor circuitry in device 10 and information on the movement of tip T can be used to adjusting the content displayed on display 34 and may otherwise be used in controlling the operation of device 24 and system 8.

Devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a head-mounted device such as glasses, goggles, a helmet, or other equipment worn on a user's head, or other wearable or miniature device, a television, a computer display that does not contain an embedded computer, a navigation device, an embedded system such as a system in which equipment is mounted in a kiosk, in an automobile, airplane, or other vehicle, or other equipment.

Device 10 may be any suitable electronic device that includes a color sensor such as a computer stylus, a stand-alone stylus used for color measurements but not used for providing computer writing input, a computer mouse, or other input accessory, a cellular telephone, a tablet computer, a wristwatch, other wearable electronic devices, other portable electronic devices, and/or other electronic equipment (e.g., one of devices 24).

Illustrative configurations for system 8 in which device 10 is a computer stylus or other stylus and device 24 is a tablet computer may sometimes be described herein as an example. This is illustrative. In general, any suitable electronic devices may be used in system 8.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or circuitry 28 may include antennas, radio-frequency transceiver circuitry, and other wireless communications circuitry and/or wired communications circuitry. Circuitry 14 and/or circuitry 28, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power (e.g., inductive power coils for transmitting and receiving wireless power) and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may include input devices that are used in gathering user input and/or that are used in gathering information on the environment surrounding the user and/or may include output devices that are used in providing a user with output. Input-output devices 16 (e.g., input devices in devices 16) may include sensors 18 and input-output devices 30 (e.g., input devices in devices 30) may include sensors 32. Sensors 18 and/or 32 may include force sensors (e.g., strain gauges, capacitive force sensors, resistive force sensors, force sensors that include pressure sensors that detect pressure in a fluid that is coupled to one or more force sensing elements formed from collapsible fluid-filled force sensor protrusions, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color light sensors for measuring ambient light and/or for making other color measurements (e.g., color sensors that include light detecting and, if desired, light-emitting devices), color sensors and/or other optical sensors that measure surface texture, image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., three-dimensional optical sensors such as structured light sensors configured to project dots of infrared light onto three-dimensional surfaces of real-world objects and sense three-dimensional shapes by capturing images of the dots using an infrared image sensor and/or optical depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 32 and/or other input-output devices 16 and/or 30 to gather user input (e.g., input devices such as buttons may be used to gather button press input, touch sensors overlapping displays can be used for gathering user touch screen input, touch pads may be used in gathering touch input, microphones may be used for gathering audio input, inertial measurement units may be used in monitoring position and/or orientation, etc.). If desired, alphanumeric keys and/or other buttons may be included in devices 16 and/or 30.

Devices 16 and/or 30 (e.g., output devices in devices 16 and/or 30) may include output devices such as haptic output devices. Haptic output devices can produce motion that is sensed by the user (e.g., through the user's fingertips or other body part). Haptic output devices in devices 16 and/or 30 may include actuators such as electromagnetic actuators such as solenoids, motors, piezoelectric actuators, electroactive polymer actuators, vibrators, linear actuators, rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24).

Devices 16 and/or 30 may include displays and/or other devices that produce visual output. For example, device 24 may include display 34, as described in connection with FIG. 1.

If desired, input-output devices 16 and/or 30 may include other devices 22 and/or 36 such as status indicator lights (e.g., a light-emitting diode in device 10 and/or 24 that serves as a power indicator, and other light-based output devices), displays (e.g., one or more displays in addition to display 34), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may include power transmitting and/or receiving circuits configured to transmit and/or receive wired and/or wireless power signals. For example, devices 10 and/or 24 may include coils and power transmitting circuitry and/or power receiving circuitry that uses the coils to transmit and/or to receive wireless power.

Sensor 54 of device 10 (FIG. 1) may include a light emitter and a light detector. Light from the light emitter may be emitted through an optical window, a transparent portion of the housing of device 10, and/or other portions of device 10 (sometimes referred to as light emitter ports). The emitted light may reflect off of an external object that is being measured. This reflected light may be detected by the light detector. The light detector may include multiple photodetectors that detect light of different colors (e.g., the light detector may be a color-sensing light detector).

Reflected light from the object may be detected by the light detector through an optical window, a transparent portion of the housing of device 10, and/or other portions of device 10 (sometimes referred to as light detector ports). Arrangements in which light is emitted and detected through a shared window or transparent portion of a device housing (e.g., through a single shared port) may be used, if desired. Optical ports for supporting the operation of sensors 54 may be located at end E, main body B, and/or tip T.

Figure 3:
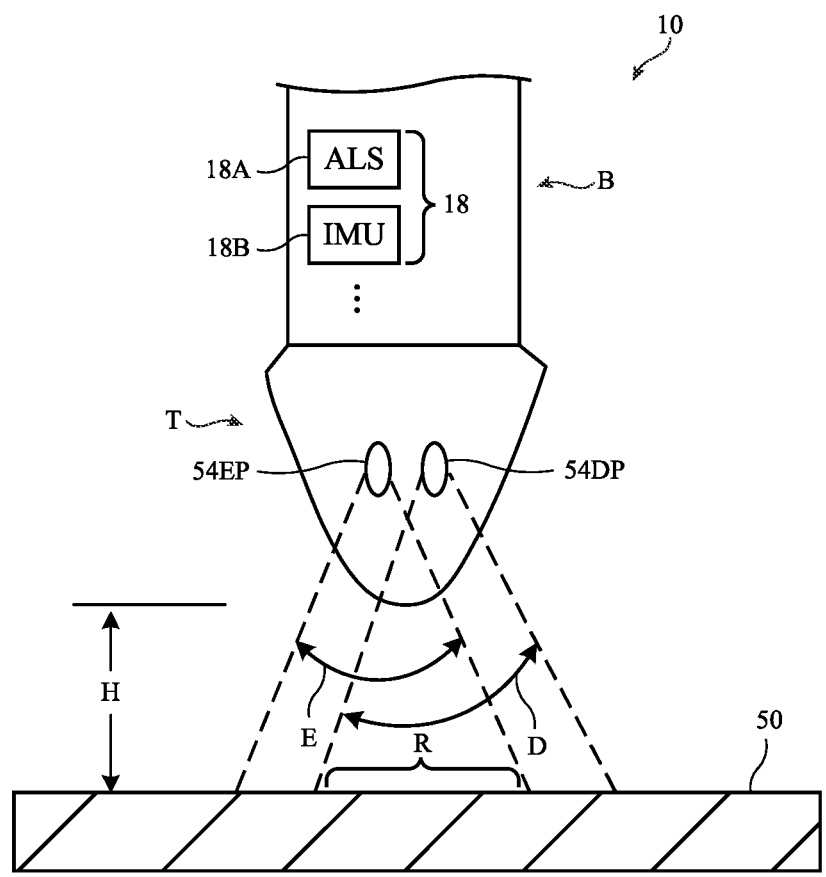
FIG. 3 is a side view of an in illustrative electronic device with a color sensor in accordance with an embodiment.

FIG. 3 is a side view of device 10 in an illustrative configuration in which device 10 includes optical ports at tip T. These optical ports include light emitter port 54EP and light detector port 54DP. During operation of device 10, light from sensor 54 is emitted through port 54EP and, after reflecting (specularly and/or diffusively) from the exposed surface of object 50, is detected by sensor 54 through port 54DP.

Ports 54EP and 54DP may be covered with clear polymer, glass, or other transparent materials and may have exterior surfaces that are flush with the adjacent surfaces of tip T (as an example). The exterior surfaces of ports 54EP and 54DP and the adjacent surfaces of tip T may, if desired, be characterized by curved cross-sectional profiles (e.g., these surfaces may have areas of compound curvature).

During operation, emitted light may be emitted over a first angular range (e.g., in a cone covering angular range E of FIG. 3) and reflected light from object 50 may be detected over a second angular range (e.g., in a cone covering angular range D of FIG. 3). The emitted light may serve to illuminate the surface of object 50, so that reflected light is detected primarily or exclusively in overlap region R, where emitted light angular range E and detected reflected light angular range D overlap. Measurements may be made while tip T is contacting object 50 or when tip T is separated from object 50 by a non-zero distance H. The value of H may be at least 10 microns, at least 50 microns, at least 250 microns, at least 1 mm, at least 5 mm, at least 25 mm, less than 50 mm, less than 10 mm, less than 2 mm, less than 400 microns, less than 100 microns, less than 20 microns, or less than 4 microns (as examples).

If desired, sensors 18 may include sensors such as ambient light sensor 18A and inertial measurement unit 18B. Ambient light sensor 18A may measure the color and intensity of ambient light. For example, ambient light sensor 18A may measure the color cast of ambient lighting in the environment surrounding device 10. Color measurements made using sensor 54 and/or color measurements made using ambient light sensor 18A may be represented using color coordinates, color temperature values, or other suitable color parameters.

Inertial measurement unit 18B (e.g., a 6-degrees-of-freedom inertial measurement unit) may be used to measure the location of device 10. For example, unit 18B may, from location measurements made over time, determine whether device 10 is at rest (e.g., on a table top) or has been picked up by a user. Device 10 may be awoken from a sleep state in response to detected motion, may take a color sample with sensor 54 in response to detected motion (or shortly thereafter in response to a suitable trigger event), or may take other suitable action in response to output from unit 18B.

If desired, unit 18B may detect contact between device 10 and object 50 (e.g., to determine when to trigger the process of capturing a color sample). Color samples may also be initiated manually (e.g., in response to user input to one of sensors 18 such as button press input, touch sensor input, force sensor input, etc.), may be initiated based on an optical proximity measurement with sensor 54 (e.g., when sensor 54 is serving as an optical proximity sensor by emitting light such as intensity-modulated light and detecting and demodulating corresponding reflected light to gauge the amount of light reflection and thereby determine whether sensor 54 is in the vicinity of an external object), may be initiated by other sensor measurements with sensor(s) 18, may be triggered based on control signals received from device 24, and/or may otherwise by initiated in system 8.

Figure 4:
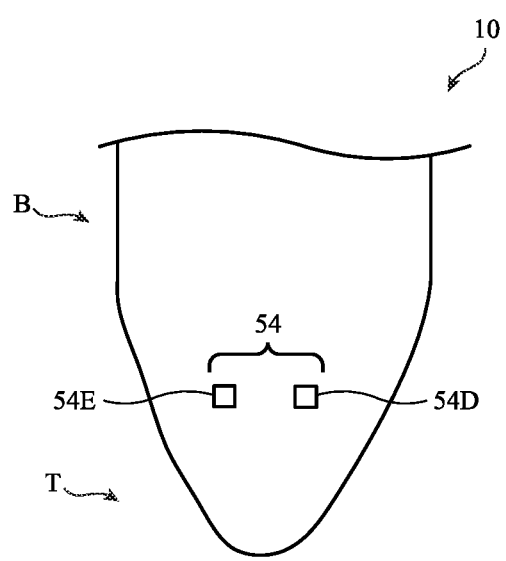
FIG. 4 is a side view of an illustrative electronic device with optical components mounted in a tip portion of an elongated electronic device in accordance with an embodiment.

The light emitter and light detector of sensor 54 may be mounted at tip T, in body B, and/or at end E. In the example of FIG. 4, light emitter 54E and light detector 54D of sensor 54 are mounted in tip T (e.g., in alignment with respective ports 54EP and 54DP of FIG. 3). Light emitter 54E can emit light to illuminate objects while light detector 54D is gathering corresponding color measurements and other optical measurements.

Light emitter 54E may have one or more light-emitting devices such as lasers (e.g., laser diodes such as vertical cavity surface emitting diodes or other laser diodes), light-emitting diodes (e.g., organic light-emitting diodes, light-emitting diodes formed from crystalline semiconductor dies, etc.), or other light-emitting components. Light emitter 54E may, as an example, include a single white light-emitting diode or two or more white light-emitting diodes (with the same or different color temperatures). As another example, light emitter 54E may contain multiple light-emitting devices such as light-emitting devices associated with different colors. There may be, for example, a first light-emitting device such as a red light-emitting device that is configured to emit red light (light in a band of wavelengths around a desired red wavelength), second light-emitting device that is configured to emit blue light, and a third light-emitting device that is configured to emit green light, and additional devices that emit light at other colors (if desired). Optional non-visible light-emitting devices (e.g., an ultraviolet light-emitting device that emits ultraviolet light and/or an infrared light-emitting device) may also be included.

Light emitter 54E may be configured to emit light through one or more ports such as port 54E (FIG. 3) in any suitable pattern. Transparent windows, lenses, mirrors, optical fibers and other light guides, and/or other optical components may be used to adjust light emission angular spreads and other output properties and may be configured to emit light in a light field having a shape of a disk, a ring (e.g., a circular light field pattern with a central area of decreased brightness), a non-circular spot, or other suitable shape(s).

The light emitted by emitter 54E may have a tunable color (e.g., a tunable white point when the emitted light is white light, a tunable color band or bands of particular color(s) when emitter 54E has discrete devices that emit colored light at different respective visible light colors such as red, green, blue, etc.). During operation, control circuitry 12 may adjust the output light spectrum of emitter 54E. For example, in a scenario in which device 10 contains a light emitter with two different light-emitting devices with two different respective white points, the relative output of each of the different light-emitting devices can be adjusted to adjust the white point of emitter 54E. In some configurations, the intensity and/or color of emitted light from emitter 54E is adjusted by control circuitry 12 in response to measured ambient light color (color measured by ambient light sensor 18A of FIG. 3) and/or is otherwise varied. In other configurations, the intensity and/or color of emitted light from light emitter 54E is not varied during measurements with sensor 54. The use of adjustable-spectrum and/or fixed spectrum illumination from light emitter 54E when making measurements on object 50 may help ensure accuracy by modifying dependencies on ambient lighting conditions, by reducing or eliminating shadowing effects, etc.

Light detector 54D may be formed from an integrated circuit (e.g., a silicon integrated circuit) and/or discrete light detecting components. To discriminate between different colors, light detector 54D may have multiple photodetectors each of which gathers and measures light in a different band of wavelengths (e.g., each of the photodetectors may have a different spectral sensitivity). These bands of wavelengths, which may sometimes be referred to as channels or color channels, may overlap slightly with each other and may, if desired, provide continuous coverage of the visible light spectrum (and, if desired, portions of the infrared light spectrum and/or ultraviolet light spectrum). Each photodetector may be overlapped by a corresponding thin-film interference filter with a desired light transmission spectrum and/or may be overlapped by a color filter formed from a layer of dye or pigment with a desired light transmission spectrum. The light transmission spectrum of each color filter may correspond to a band of wavelengths at a different location of the visible light spectrum or other desired portion of the light spectrum. For example, a red channel photodetector may have a color filter that passes red light wavelengths while blocking all other wavelengths. If desired, ultraviolet light sensitivity and/or infrared light sensitivity can be provided by incorporating ultraviolet and/or infrared channels into light detector 54D. Light emitter 54E may also be provided with ultraviolet and/or infrared light emitting capabilities. Arrangements in which light emitter 54E emits visible light and detector 54D is used to make visible light measurements are sometimes described herein as an example.

In configurations in which light detector 54D is formed from an integrated circuit, photodetectors for different color channels can be distributed throughout the integrated circuit and, if desired, redundant photodetectors (e.g., photodetectors measuring the same color of light) may be included in light detector 54D. As an example, photodetectors in detector 54D may include photodetectors for 3-10 different color channels and each color channel may have 1-5 different individual photodetectors for gathering a light measurement for that color channel. Supporting circuitry (e.g., switching circuitry, amplifier circuitry, analog-to-digital conversion circuitry, communications circuitry for supporting communications with control circuitry elsewhere in device 10, etc.) may be incorporated into an integrated circuit that contains photodetectors for detector 54D or, if desired, some or all of this supporting circuitry may be formed in one or more integrated circuits that are separate from the photodetectors of detector 54D.

There may, in general, be any suitable number of photodetectors in light detector 54D and any suitable number of light-emitting devices in light emitter 54E. The number of photodetectors of different colors in detector 54D may, for example, be at least five, at least six, at least 10, at least 15, at least 20, at least 30, fewer than 50, fewer than 40, fewer than 35, fewer than 25, fewer than 15, or other suitable number. The number of light-emitting devices of different colors in light emitter 54E may be, for example, at least two, at least three, at least four, 2-10, less than 10, less than 5, less than the number of photodetectors in light detector 54D, or other suitable number. If desired, emitter 54E may contain a single light-emitting device or multiple devices that emit light with the same spectrum.

Emitter 54E may use one or more white light light-emitting diodes or other white light source to emit white light and/or multiple light-emitting devices in emitter 54E may be used simultaneously (e.g., to illuminate a surface of an external object such as object 50 with a combination of red, green, and blue illumination and/or other colored light illumination). Light-emitting devices of different colors and/or a white light-emitting device can also be used separately. Emitter 54E may, as an example, be used to emit red light (without emitting blue and green light) while light detector 54D makes a first set of color measurements using, and may then separately emit blue light and green light to make corresponding second and third sets of color measurements or may be used to emit white light while light detector 54D makes measurements.

Color data gathered by sensor 54 can be represented in any suitable format. For example, a color measurement may be represented using color coordinates, a color temperature, a correlated color temperature, spectral information (e.g., a visible light spectrum for the light from object 50 and/or infrared and/or ultraviolet spectral information). More accurate color measurements can be made (e.g., to produce an accurate color spectrum) by including more colors of light-emitting devices and/or by providing more detector channels (e.g., more photodetectors of different colors).

Figure 5:
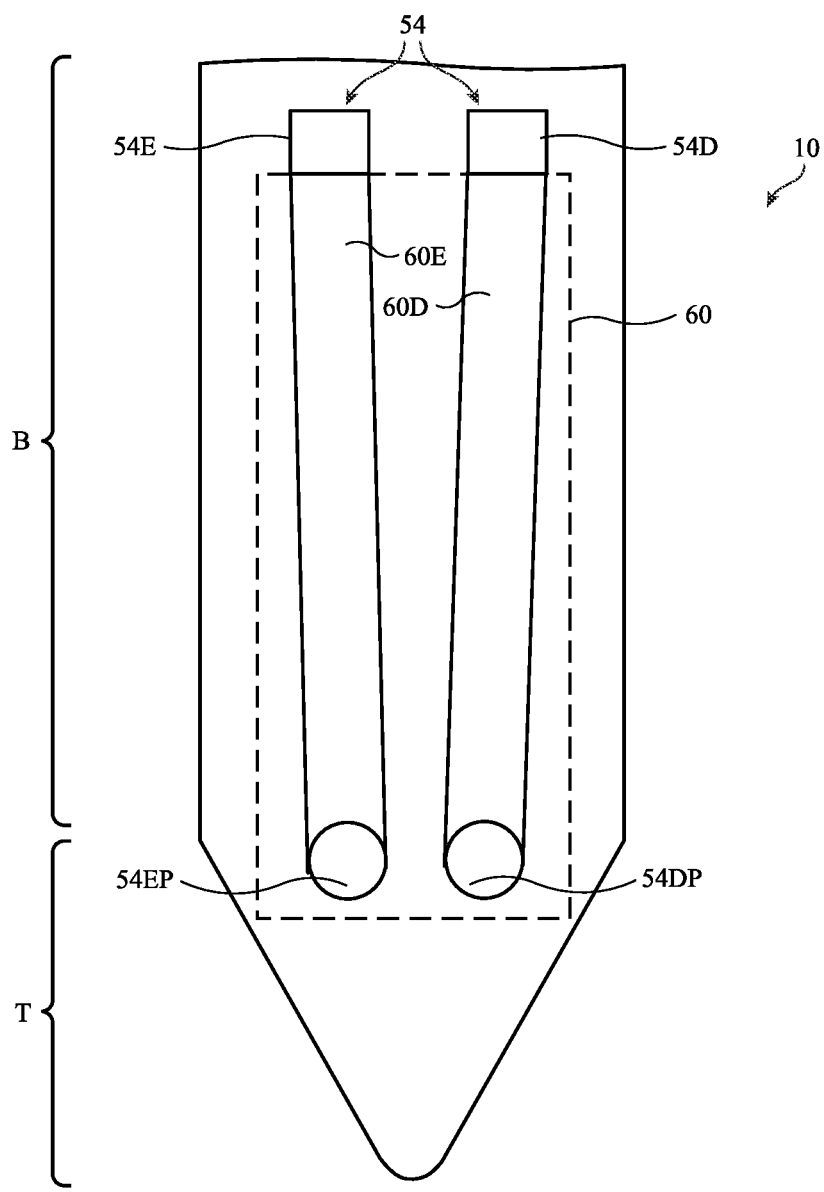
FIG. 5 is a side view of an illustrative electronic device with optical components that are mounted in a shaft portion of a device housing and that are optically coupled to a tip portion of the device using light guides in accordance with an embodiment.

If desired, sensor 54 may be mounted in body B while emitting light and detecting light through ports at tip T. This type of arrangement is shown in FIG. 5. As shown in FIG. 5, light emitter 54E and light detector 54D of sensor 54 may be mounted in body B. Light guide structures 60 may include one or more light guides such as light guides 62 and 64. Light guide structures 60 may be used to convey emitted light from sensor 54 to tip T and to convey reflected light that is received at tip T to sensor 54. Light guide structures 60 may be formed from optical fibers and/or transparent members formed from polymer, glass, ceramic, and/or other clear materials. Light may be confined by providing a light guide core with a cladding of a lower refractive index (thereby promoting light guiding in the core in accordance with the principal of total internal reflection) and/or light may be confined using metal coatings, thin-film interference filter mirror coatings formed from a stack of dielectric layers of alternating refractive index, or other reflective coatings on a light guide core.

In the example of FIG. 5, light guide structures 60 have a first light guide 60E that is used to convey light emitted by light emitter 54E in main body B to port 54EP at tip T and have a second light guide 60D that is used to convey light reflected from object 50 that has been received at port 54DP in tip T to light detector 54D in main body B. Light guides 60E and 60D may be separate optical fibers, may be separate light pipes (e.g., elongated clear cylindrical members or light guides or other suitable shapes), and/or may be formed from a common member that is machined or molded to form separate light guides. There may be individual light guides for each light-emitting device in emitter 54E and/or each photodetector in light detector 54D and/or multiple light-emitting devices and/or photodetectors may share light guides. For example, all of the light-emitting devices in emitter 54E may be coupled to the end of a first light guide and all of the photodetectors in detector 54D may be coupled to the end of a second light guide. Arrangements in which emitter 54E and detector 54D share a common light guide may also be used.

As described in connection with FIG. 3, sensor output may be monitored to determine when to awaken device 10 from a low-power sleep state (e.g., to cause control circuitry 12 and other circuitry in device 10 to transition from a low-power sleep state to a normal operating mode in which more power is consumed). Sensor output may also be used to trigger the capturing of a color measurement with sensor 54.

Figure 6:
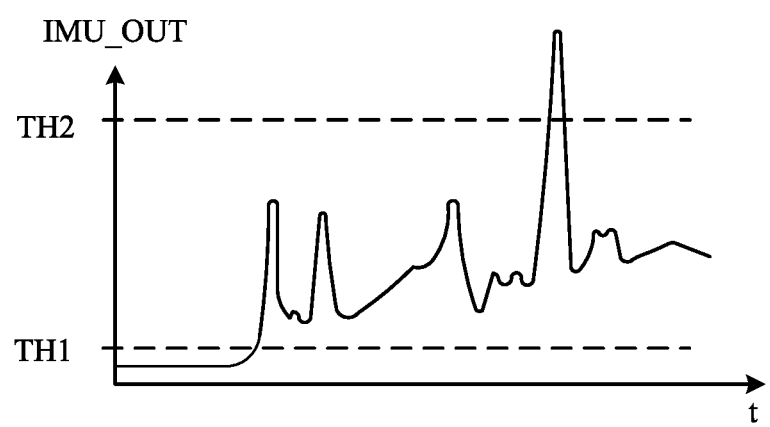
FIG. 6 is a graph of illustrative output from a sensor showing how device movements and a tap against a target may be detected with the sensor in accordance with an embodiment.

FIG. 6 is a graph of illustrative output from an inertial measurement unit such as unit 18B of FIG. 3. Unit 18B may, as an example, contain an accelerometer that is sensitive to movement of device 10. In an illustrative configuration, so long as the output IMU_OUT from unit 18B remains below first threshold TH1 (e.g., when device 10 is resting on a table), device 10 remains in a low power sleep state. When threshold TH1 is exceeded, control circuitry 12 transitions device 10 to a normal operating mode in which device 10 can potentially capture color measurements using sensor 54. In this state, color sensor 54 may operate in a proximity sensor mode to detect when tip T is adjacent to object 50 and/or other sensors can be activated to monitor for one or more conditions triggering a color measurement capture.

As one example, control circuitry 12 monitors the output IMU_OUT from unit 18B to determine when this output exceeds threshold TH2. When a user taps against object 50 (in this example), a spike in output IMU_OUT results and threshold TH2 is exceeded. In response, control circuitry 12 can use sensor 54 to measure the color of object 50. Color sensor measurements may also be triggered in response to button input or other user input, output from sensor 54 when sensor 54 is being used in a proximity sensor mode, and/or other sensor input. Other aspects of the operation of device 10 can be controlled using output from unit 18B, if desired. The present example, in which output IMU_OUT is used to initiate a transition from a sleep mode to a wake mode and is used to trigger color sampling with sensor 54 is illustrative.

During color measurements, the magnitude of detected light can be analyzed. This provides device 10 with information on the reflectivity of the surface of the target object. Reflectivity information may be captured with color measurements and/or may be measured separately.

Figure 7:
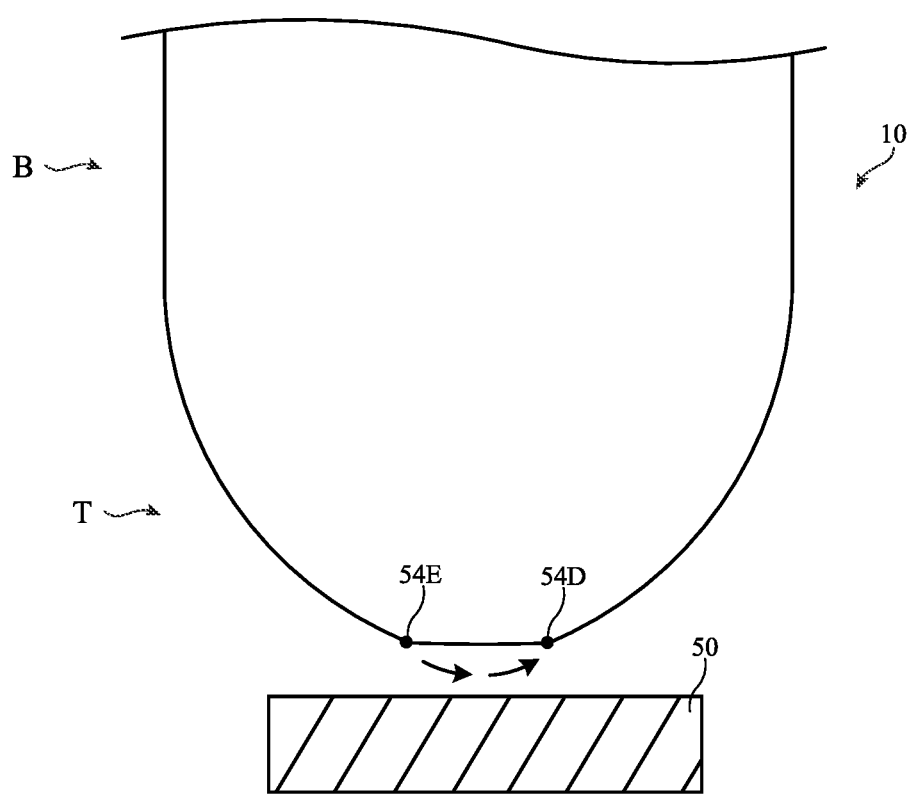
FIG. 7 is a side view of an illustrative electronic device having a light-emitting device and corresponding light sensor configured to measure texture on the surface of a target in accordance with an embodiment.

As shown in FIG. 7, some or all of the light from ports such as port 54E may be emitted laterally so that this light strikes the surface of object 50 at a shallow angle (e.g., the emitted light includes glancing angle light rays that are nearly tangential to the surface). For example, light from port 54E may be emitted in a direction that makes an angle of less than 10°, less than 20°, or other relatively small value with respect to the surface of object 50 (e.g., the X-Y plane of FIG. 7). This light may reflect from texture in the surface of object 50. The amount and type of texture that is present can affect the amount of emitted light that is reflected back towards a detector adjacent to the emitter and the amount of emitted light that is allows to continue onwards to a detector such as illustrative detector 54D of FIG. 7, which is located on an opposing side of device 10 from the emitter. For example, a textured surface may have microprotrusions characterized by microsurfaces with associated surface normals. The amount of light reflected from the microsurfaces can be influenced by the orientations of the surface normals relative to the direction of propagation of the emitted light, so by making measurements on reflected light, sensor 54 can gather information on the amount and type of texture present on object 50. In this way, device 10 may be configured to measure texture in addition to or instead of measuring color and/or reflectivity for object 50.

Figure 8:
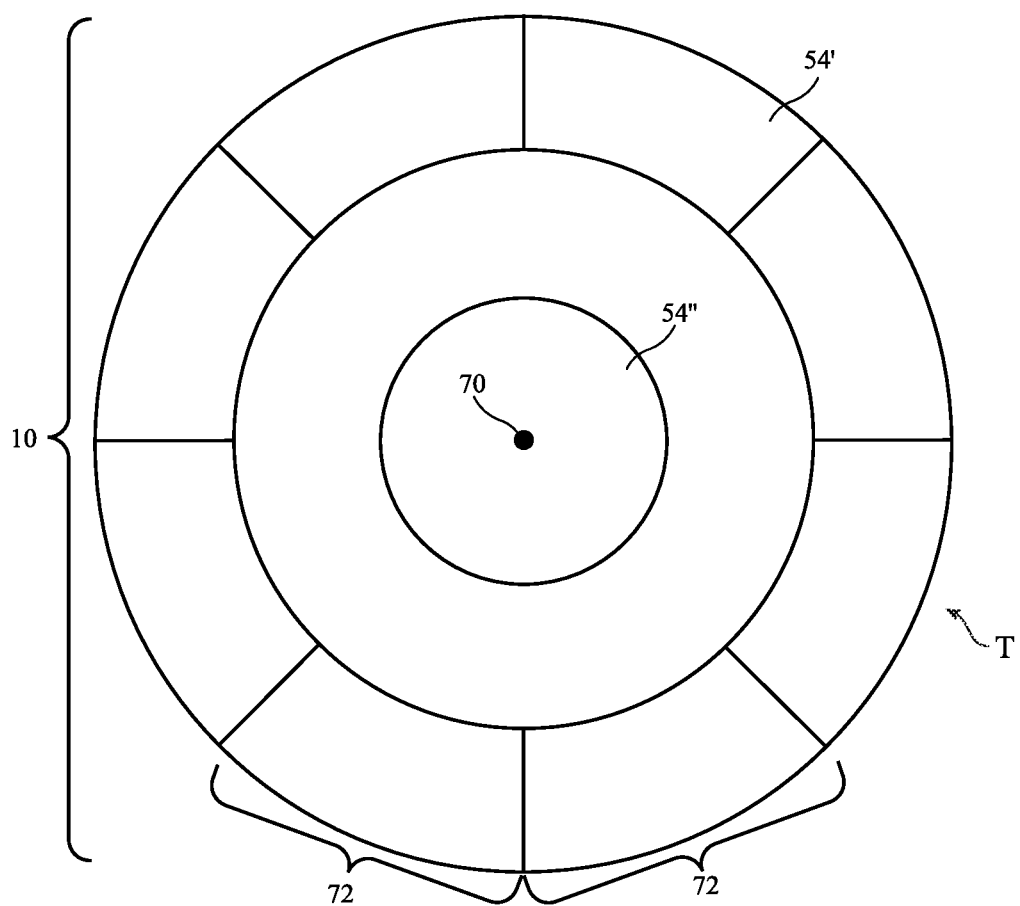
FIG. 8 is an end view of an illustrative tip portion of an electronic device in accordance with an embodiment.

If desired, ports 54EP and/or 54DP may have ring shapes and/or other shapes that are rotationally symmetric with respect to the central longitudinal axis of device 10 (which may serve as an axis of rotational symmetry for the housing of device 10 in configurations in which device 10 has a cylindrical housing body). Consider, as an example, the view of tip T of device 10 in FIG. 8, which is taken along rotational axis 70 of device 10. In this example, ports 54' and 54" may serve as light-emitting ports and/or light detecting ports. As an example, port 54', which has a ring shape that is centered on axis 70 may be a light emitting port and port 54", which has a circular shape, may be a light detector port that is centered on axis 70. Port 54' in this example, may have multiple angularly separated sectors 72, each of which may be associated with a different light-emitting device (e.g., light from a different light-emitting diode or different laser). In another illustrative arrangement, sectors 72 may include first sectors that are associated with light-emitting devices in emitter 54 and may include second sectors that are associated with photodetectors in detector 54D. The first and second sectors may alternate with each other as a function of distance around the ring. A different optical fiber or other light guide may be coupled to each sector 72 and/or light guide structures 60 may otherwise be configured to guide light from components in sensor 54 and the sectors of port 54'.

During operation, sensor 54 may emit light and/or detect light using the sectors of port 54' and/or other suitable ports in tip T. Light may be emitted downward (e.g., parallel to axis 70 of FIG. 8) or may be emitted laterally (e.g., perpendicular or nearly perpendicular to axis 70, to create glancing angle light rays as described in connection with FIG. 7). The detectors in sensor 54 may detect glancing rays that reflect back towards the emitting device(s) and/or may detect glancing rays that are detected on the opposing side of tip T. The amount of the emitted light that reflects from object 50 and is detected by one or more photodetectors in detector 54D may be analyzed to gather information on texture, color, reflectivity, and/or other optical characteristics of object 50. Other arrangement may be used if desired. For example, port 54" may have multiple sectors and/or port 54' may be used for light emission while port 54" is being used for light detection, etc.

Figure 9:
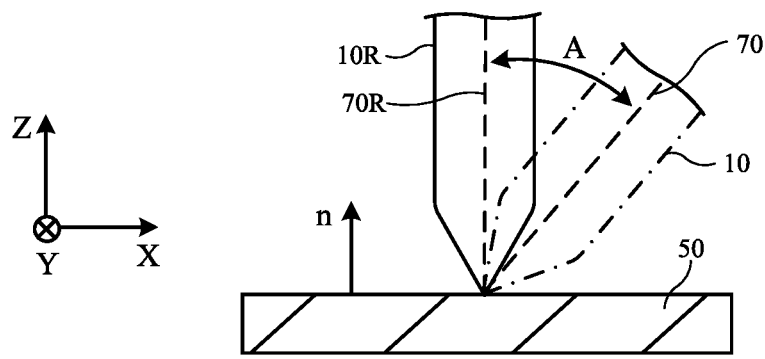
FIG. 9 is a side view of an illustrative electronic device being moved through a range of angles with respect to a surface normal of a target surface during surface sampling in accordance with an embodiment.

If desired, the user of device 10 may move device 10 through a range of angles with respect to object 50 during measurements with sensor 54. Consider, as an example, the arrangement of FIG. 9. In this example, a user initially places device 10 in the position shown by device 10R, so that the longitudinal axis of the device lies parallel to surface normal n of object 50. The user may tap the device against the surface of object 50 to inform control circuitry 12 that the device is perpendicular to the surface of object 50. Control circuitry 12 may then register the current measured angular orientation from inertial measurement unit 18B as corresponding to a condition in which the device is parallel to surface normal n and perpendicular to the surface of object 50. After "zeroing out" the angular measurements of unit 18B in this way, the user may tilt the device relative to the surface of object 50. For example, the user may tilt the device so that the device captures sensor measurements from sensor 54 over a range of non-zero angles A between longitudinal axis 70 of device 10 and surface normal n. This allows device 10 to capture reflectance and color information (and, if desired, texture information) with sensor 54 over a range of tilt angles measured with unit 18B. Color sensor measurements and tilt measurements may then be wirelessly transmitted to device 24, providing more information to device 24 than possible from a single measurement at a single angular orientation A.

Figure 10:
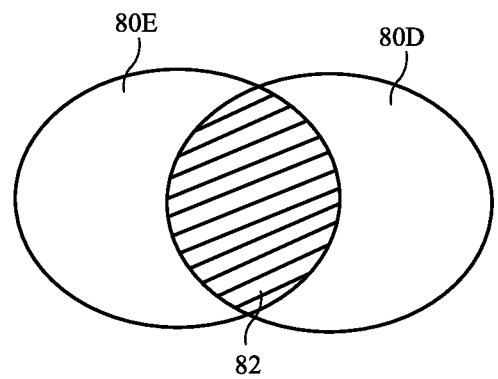
FIGS. 10 and 11 are diagrams of illustrative illumination and detection coverage regions as an electronic device is tilted relative to a surface in accordance with embodiments.
Figure 11:
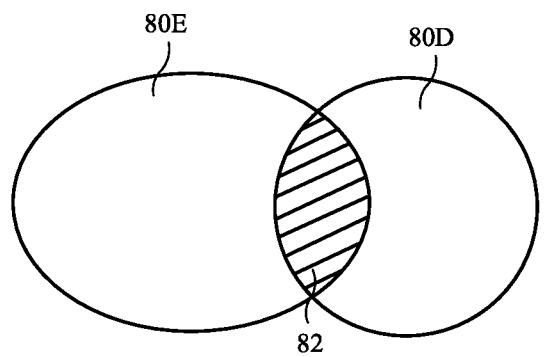

In arrangements of the type shown in FIG. 3, light is emitted from port 54EP over a first range of angles (in effect a light emission cone) and light is detected over a second range of angles (in effect a light detection cone). The shape of the area on the surface of object 50 where these two cones intersect is influenced by tilt angle A. As shown in the examples of FIGS. 10 and 11, light illumination area 80E and light detection area 80D on the surface of object 50 may overlap in an overlap area 82 of a first size (and shape) when angle A is zero (FIG. 10) and may overlap in an overlap area 82 of a second size (and shape) when angle A has a non-zero value (FIG. 11). During operation, angular measurements from unit 18B may be used to determine the value of angle A and this value may be used to compute the size of overlap area 82 and thereby compensate for the expected change in the size of overlap area 82 as a function of tilt angle A. In some configurations, device 10 may process the amount of signal received at detector 54D to determine angle A without requiring measurements with inertial measurement unit 18B. Tilt angle information gathered with these approaches and/or other approaches can be correlated with color measurements with sensor 54 and transmitted together to device 24.

Figure 12:
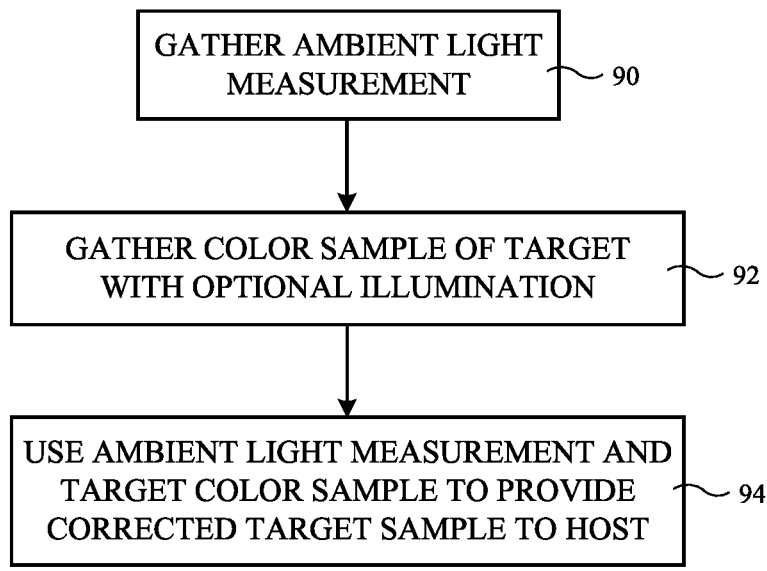
FIG. 12 is a flow chart of illustrative operations involved using a system in accordance with an embodiment.

FIG. 12 is a flow chart of illustrative operations involved in using system 8.

During the operations of block 90, device 10 may use ambient light sensor 18A to measure ambient light (e.g., to measure ambient light intensity and color). The ambient light sensor measurement may be used in adjusting the light output of light emitter 54E and/or may be used in adjusting measurements made with light detector 54D.

During the operations of block 92, control circuitry 12 may direct sensor 54 to make measurements. A single sample may be captured with sensor 54 or a series of measurements may be made (e.g., while device 10 is being tilted over a range of angles A). Triggering conditions for making measurements may include reception of user input, sensor measurements on the environment, received control signals from device 54, satisfaction of one or more other conditions, or the occurrence of two or more of these events. Control circuitry 12 may, if desired, implement a sensor fusion arrangement in which input from multiple input devices such as sensors 18 is processed to determine when to gather a color measurement with sensor 54. For example, control circuitry 12 may gather a color sensor measurement in response to determining that both (1) detector 54D is measuring more than a threshold amount of reflected light from emitter 54E (in effect detecting that the output of an optical proximity sensor formed from emitter 54E and detector 54D is producing more than a predetermined output thereby indicating that device 10 is within the vicinity of object 50) and (2) an orientation sensor such as inertial measurement unit 18B in device 10 has detected that device 10 is right side up so that tip T is lower than end E. As another example, control circuitry 12 may direct sensor 54 to gather a color sensor measurement in response to output from an input device such as a force sensor in tip T or output from unit 18B that indicates that tip T has been tapped and/or pressed against object 50. Device 10 (e.g., control circuitry 12) may also make color measurements in response to detection of user input from a button, user input from a touch sensor, user input commands received from device 24, and/or other user input (as examples). In some embodiments, an input-device such as a button based on a touch sensor or mechanical switch that is mounted on a side of portion of device 10 (e.g., on the side of a cylindrical housing shaft forming main body B) may be used in triggering color measurements.

Objects on which color measurements are made (see, e.g., object 50 of FIG. 1) may include real-world objects (furniture, household items, etc.), displays such as display 34, printed paper (e.g., artwork on a printed page), paint on a house or other surface, a portion of a human body (skin, hair, etc.), and/or may other physical items in the environment surrounding device 10 from which a user desires to gather color information.

Object 50 may or may not be illuminated with light from light emitter 54E during measurements with detector 54D. The light that is emitted from light emitter 54E may be white light, may be colored light, may be emitted at a single wavelength, and/or may be emitted at multiple wavelengths (e.g., a set of multiple discrete colors). Light emitter 54E may emit fixed spectrum light (e.g., the spectral output of emitter 54E may be fixed and non-adjustable) or light emitter 54E may emit adjustable spectrum light. In some configurations, emitter 54E may emit light with a color (e.g., visible light spectrum), intensity, and/or other properties are adjusted based on ambient light sensor readings from ambient light sensor 18A and/or other data.

Consider, as an example, a first illustrative scenario in which it is desired to illuminate target object 50 with light having a color that matches the color of the current ambient lighting conditions for the environment in which device 10 is being operated. A user may, as an example, be operating device 10 in warm ambient lighting conditions. Ambient light sensor 18A may measure the color of the warm ambient light and may provide this information to control circuitry 12. Control circuitry 12 may then adjust the output of light emitter 54E to provide the illumination of the same warm color. Emitter 54E may, as an example, have multiple white light-emitting diodes of different respective color temperatures that respectively emit white light with different white points, ranging from cold to warm. By adjusting the relative intensity of each of these multiple output devices, emitter 54E may control the color temperature of the light emitted by emitter 54E. In this way, emitter 54E may produce white light output that has the same color cast (e.g., the same white point) as that color cast of the ambient light measured by sensor 18A. By replicating ambient lighting conditions when illuminating object 50, device 10 can provide sufficient illumination for color sensing operations (and/or other optical sensing operations) with detector 50 without requiring bright ambient lighting conditions, without requiring an absence of shadows on object 50, etc.

In a second illustrative scenario, ambient light sensor 18A is turned off (or omitted). In this scenario, light-emitter 54E may emit white light (or light at one or more known colors) with a known visible light spectrum while detector 54D measures the color of object 50. By supplying illumination with a known spectrum to object 50, device 10 can ensure that color measurements are made under known lighting conditions.

In a third illustrative scenario, ambient light sensor 18A is used to make an ambient light color measurement. This ambient light data can reveal whether current ambient lighting conditions are cold, are warm, or have a particular color cast (e.g., excessive red light in a situation in which device 10 is being used near a red lamp). This ambient light color information can then be used to color-compensate readings made with detector 54D on object 50 under ambient light illumination (e.g., illumination conditions in which emitter 54E is turned off or omitted). If, as an example, the ambient light that is illuminating object 50 is cold, this cold ambient light will tend to impart a cold appearance to object 50 that could unintentionally skew color samples made with detector 54D. By correcting the readings made with detector 54D using the measured ambient light color information from sensor 18A, potential color measurement skew due to ambient light color characteristics can be reduced or eliminated.

In a fourth illustrative scenario, ambient light sensor 18A is turned off or is omitted and light emitter 54E is adjusted during measurements on object 50 with detector 54D. The adjustments made to light emitter 54E may be used to vary light output intensity and/or color. As one example, emitter 54E may produce white light illumination of a known white point (color). During color measurements on object 50 with detector 54D, emitter 54E may be modulated in intensity (with any suitable modulation pattern, duty cycle, frequency, modulation depth, etc.). For example, during color measurements with detector 54D, emitter 54E may be modulated to alternative turn on and turn off the white light illumination from emitter 54E (at any suitable frequency such as a frequency of at least 1 Hz, at least 10 Hz, at least 100 Hz, at least 1 kHz, at least 10 kHz, less than 1 MHz, less than 100 kHz, less than 10 kHz, less than 1 kHz, or other suitable modulation frequency). By comparing the color measurements made with detector 54D during the time periods in which emitter 54E is on and is illuminating object 50 and during the time periods in which emitter 54E is off and is not illuminating object 50 so that object 50 is solely illuminated by ambient light, ambient light color cast contributions to the measured color of object 50 can be removed from the color measurements. In this way, any color imparted to object 50 due to excessively warm or cold ambient lighting conditions can be subtracted out of the color measurements made by detector 54D, helping to ensure color measurement accuracy.

During these scenarios and/or other illustrative measurement scenarios with detector 54D, a user may, if desired, tilt device 10 through a range of angles A to gather additional information (e.g., texture information, reflectivity as a function of angle, etc.). Inertial measurement unit 18B and/or other circuitry in device 10 may be used to measure angle A (e.g., following a registration operation in which a user taps device 10 against the surface of object 50 while device 10 is perpendicular to this surface to zero out the angle being measured by unit 18B). In scenarios in which device 10 has light-emitting devices and/or light-detecting devices arranged in a ring or other pattern that supports glancing angle measurements, information on texture may, if desired, be gathered while glancing angle measurements are made using light emitted across the surface of object 50 and/or are detected across the surface of object 50 in one or more different directions.

During the operations of block 94, the color measurement(s) and associated in formation such as tilt angle, texture information, etc. that have been gathered may be used in system 8. As an example, color measurement information and associated tilt information, reflectivity information, and/or texture information may be transmitted wirelessly from device 10 to device 24 and used to adjust a color and/or other appearance attributes of a visual element in a drawing program or other software. These color measurements may include measurements made under illumination from emitter 54E that has been adjusted in color (light spectrum) based on measured ambient light color, may include measurements made under known (reference) lighting conditions (e.g., a reference white light, known colors of light, etc.), may include color samples that have been compensated for ambient light color cast by subtracting ambient light color cast contributions from the color data from detector 54D, may include color measurements made by turning on and off light emitter 54E or otherwise modulating the intensity of emitted light from emitter 54E to subtract the color cast contribution from ambient light on the color measurements, and/or may include other raw and/or modified measurement data from detector 54D.

Figure 13:
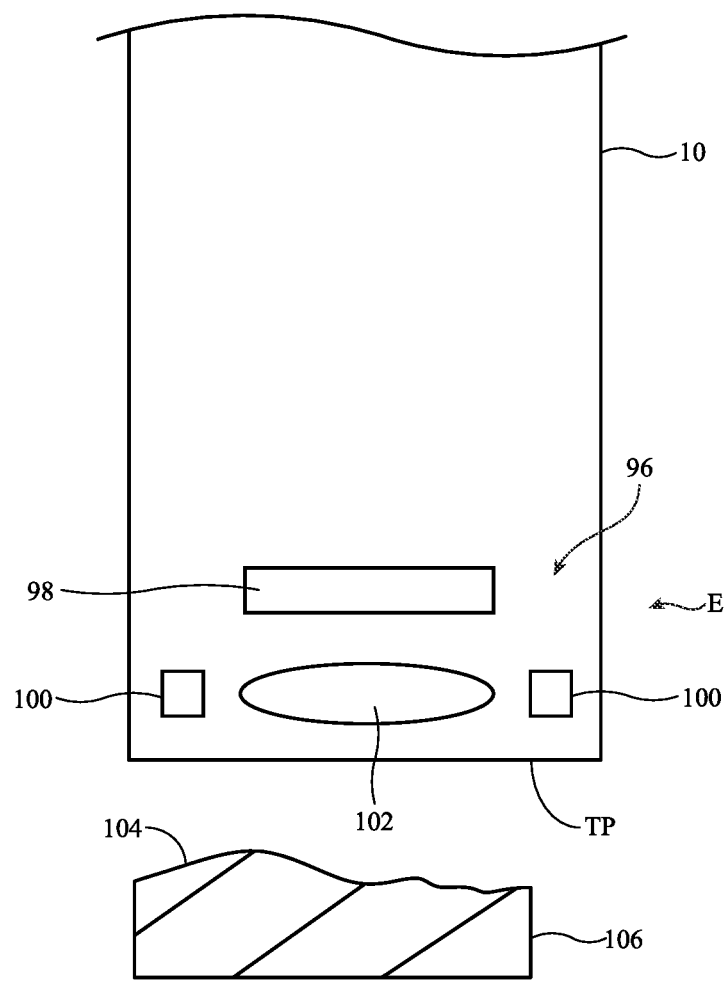
FIG. 13 is a side view of an illustrative electronic device with a texture sensor in accordance with an embodiment.

As shown in FIG. 13, end E of device 10 may include texture sensor 96. Texture sensor 96 may use light to measure the texture of surface 104 of external objects such as target 106. This information may then be provided wirelessly (e.g., using a Bluetooth® link or other wireless communications link) to a companion device such as a computer for use in a drawing program or other application.

Sensor 96 may be a photometric stereo endoscope that uses a photometric stereo process to measure surface texture. With the photometric stereo process, computer vision is used in reconstructing the surface profile and reflectance properties of surface 104 using a single viewpoint and multiple images under different lighting conditions. Sensor 96 has one or more light sources 100 (e.g., one light source 100, two light sources 100, more than two light sources 100, two to four light sources 100, fewer than five light sources, and/or other suitable number of light sources 100). Light sources 100 may be located at different respective positions around the periphery of lens 102. Light sources 100 may each include one or more light-emitting devices such as light-emitting diodes operating at one or more visible and/or infrared wavelengths and may optionally contain fibers, lenses, and/or other light directing structures coupled to the outputs of the light-emitting devices to help direct emitted light in different desired directions towards target 104. Image sensor 98 (e.g., a two-dimensional image sensor) operates at corresponding visible and/or infrared wavelengths. Lens 102 may form an exterior surface of device 10 or may be covered with a transparent housing structure such as transparent housing wall TP.

During operation, light from light sources 100 may pass through transparent housing wall TP and, after reflecting (specularly and/or diffusively) from surface 104 may be measured as captured images by image sensor 98. The control circuitry in device 10 may control the activation of light sources 100 (e.g., sources 100 may be selectively turned on and off). By cycling through each of sources 100 in sequence while capturing synchronized image frames with the camera formed by lens 12 and image sensor 98, device 10 may capture multiple images at different respective illumination angles, thereby gathering information on the texture of surface 104. Sampled texture information may be used in a drawing program or other program (e.g., as part of a brush pallet, etc.)

The effective focal length of lens 102 may be 1-1.5 mm, at least 0.3 mm, less than 3 mm or other suitable value. The distance between end E and target 106 during sampling may be about 10 mm, 3-30 mm, at least 5 mm, less than 20 mm, or other suitable distance. Sensor 98 may be a 2-megapixel sensor or may be a sensor with an array of at least 1 megapixels, fewer than 5 megapixels, or other suitable pixel count). The pixel pitch of sensor 98 may be 1-3 microns or other suitable size. The diagonal size of image sensor 98 may be at least 2 mm, at least 4 mm, 5 mm, less than 10 mm, less than 6 mm, 3-7 mm, or other suitable size. The resolution of sensor 96 may be at least 5 microns, at least 10 microns, 10-20 microns, 15 microns, less than 30 microns, less than 20 microns, or other suitable resolution.

System 8 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

Table of reference numerals

| | | | |
|---|---|---|---|
| 8 | System | 10, 10', 10R | Electronic Device |
| 12 | Control Circuitry | 14 | Communications Circuitry |
| 16 | Input-Output Devices | 18 | Sensors |
| 22 | Other Devices | 24 | Electronic Device |
| 26 | Control Circuitry | 28 | Communications Circuitry |
| 30 | Input-Output Devices | 32 | Sensors |
| 34 | Display | 36 | Other Devices |
| 38 | Wireless Link | 50 | Object |
| 52 | Line | 54 | Color Sensor |
| T | Tip | E | End |
| B | Main Body | 18A | Ambient Light Sensor |
| 18B | Inertial Measurement Unit | 54EP, 54DP, 54', 54" | Ports |
| H | Distance | E, D | Angular Ranges |
| R | Overlap Region | 54E | Emitter |
| 54D | Detector | 60, 60E, 60D | Light Guide Structures |
| 70, 70R | Axes | 72 | Segments |
| 80E 82, 80D | Areas | 90, 92, 94 | Blocks |
| 106 | Object | 98 | Image Sensor |
| 102 | Lens | 104 | Surface |
| 96 | Texture Sensor | 100 | Light Sources |
| TP | Wall | | |

What is claimed is:

1. A stylus configured to sense an external object, comprising:
    an elongated stylus housing having a tip and an opposing end;
    a color sensor in the elongated stylus housing;
    an ambient light sensor configured to make an ambient light sensor measurement;
    control circuitry configured to use the color sensor and to use the ambient light sensor measurement in producing a color sensor measurement on the external object; and
    light guide structures coupled between the color sensor and the tip, wherein the light guide structures are configured to guide light emitted by the color sensor to the tip and are configured to guide reflected light from the external object from the tip to the color sensor.

2. The stylus defined in claim 1 wherein the ambient light sensor measurement comprises an ambient light color measurement, wherein the color sensor is configured to gather the color sensor measurement, and wherein the control circuitry is configured to adjust the color sensor measurement using the ambient light color measurement.

3. The stylus defined in claim 1 wherein the color sensor is configured to emit light with a light spectrum and wherein the control circuitry is configured to adjust the light spectrum based on the ambient light sensor measurement.

4. The stylus defined in claim 3 wherein the color sensor comprises a light detector that is configured to measure reflected light from the external object while the color sensor is emitting the light of the adjusted light spectrum.

5. The stylus defined in claim 4 wherein the ambient light sensor measurement comprises an ambient light color and wherein the color sensor is configured to adjust the light spectrum to match the ambient light color.

6. The stylus defined in claim 1 wherein the color sensor comprises a light emitter and a light detector and wherein the light emitter is configured to emit white light.

7. The stylus defined in claim 6 wherein the light emitter is configured to adjust a white point of the white light.

8. The stylus defined in claim 7 wherein the ambient light sensor measurement comprises a measurement of ambient light color and wherein the light emitter is configured to adjust the white point of the white light to match the ambient light color.

9. The stylus defined in claim 1 wherein the color sensor comprises light-emitting devices configured to emit respective different colors of light.

10. The stylus defined in claim 1 wherein the color sensor has a light emitter and a light detector, wherein the elongated stylus housing has a main body between the tip and the end, wherein the color sensor is in the main body, and wherein the light guide structures comprise:
    a first light guide coupled between the light emitter and a first port at the tip; and
    a second light guide coupled between a second port at the tip and the light detector.

11. The stylus defined in claim 10 wherein the tip has a surface with a curved cross-sectional profile and wherein the first and second ports are flush with the surface.

12. The stylus defined in claim 1 further comprising a ring-shaped color sensor port at the tip, wherein the light guide structures are coupled between the color sensor and the ring-shaped color sensor port.

13. The stylus defined in claim 12 wherein the ring-shaped color sensor port has segments through which the emitted light passes and alternating segments through which the reflected light from the external object passes.

14. The stylus defined in claim 1 wherein the color sensor comprises a light emitter that emits light at an intensity and comprises a light detector and wherein the control circuitry is configured to modulate the intensity while measuring reflected light from the external object with the light detector.

15. The stylus defined in claim 1 wherein the color sensor comprises a light detector with multiple photodetectors with different spectral sensitivities.

16. The stylus defined in claim 1 wherein the color sensor comprises a light detector that is configured to receive reflected light from the external object to make a color measurement on the external object in absence of illumination from the stylus and wherein the control circuitry is configured to adjust the color measurement based on the ambient light sensor measurement.

17. The stylus defined in claim 1 wherein the color sensor comprises a light emitter configured to emit light and wherein the control circuitry is configured to modulate the light emitter to vary an intensity of the emitted light while using the color sensor to measure reflected light from the external object.

18. An electronic device configured to sense an external object, comprising:
   a housing;
   a color sensor coupled to the housing, wherein the color sensor comprises a light detector having a plurality of photodetectors associated with a plurality of respective color channels of different colors and wherein the color sensor has a light emitter with an adjustable light emission spectrum;
   an ambient light sensor configured to make an ambient light sensor measurement; and
   control circuitry configured to:
      adjust the adjustable light emission spectrum for light emitted by the light emitter that illuminates the external object;
      use the light detector to measure reflected light produced when the emitted light reflects from the external object to produce a color sensor measurement; and
      adjust the color sensor measurement based on the ambient light sensor measurement.

19. The electronic device defined in claim 18 further comprising an inertial measurement unit configured to measure an angular orientation between the housing and the external object while the light detector measures the reflected light.

20. The electronic device defined in claim 19 wherein the electronic device is operable with external electronic equipment and wherein the control circuitry is further configured to wirelessly transmit information on the angular orientation and the measured reflected light to the external electronic equipment.

21. The electronic device defined in claim 20 wherein the control circuitry is configured to adjust the adjustable light emission spectrum based on the ambient light sensor measurement.

22. A computer stylus operable to sense an external object, comprising:
   an elongated housing having a tip and a main body;
   a light emitter in the main body that is configured to emit light;
   a first light guide that extends between the light emitter and the tip and that provides the emitted light to the external object to produce reflected light;
   a color sensing light detector in the main body;
   a second light guide that extends between the tip and the color sensing light detector to provide the reflected light to the color sensing light detector;
   an ambient light sensor configured to measure ambient light color; and
   control circuitry configured to adjust the light emitter based at least partly on the measured ambient light color.

23. The computer stylus defined in claim 22 further comprising a texture sensor.

24. The computer stylus defined in claim 23 wherein the texture sensor comprises a lens in an end portion of the main body, an image sensor configured to capture images through the lens, and a plurality of light sources around the lens.

25. A stylus configured to sense an external object, comprising:
   an elongated stylus housing having a tip and an opposing end;
   a color sensor in the elongated stylus housing;
   control circuitry configured to use the color sensor in producing a color sensor measurement on the external object; and
   light guide structures coupled between the color sensor and the tip, wherein the light guide structures are configured to guide light emitted by the color sensor to the tip and are configured to guide reflected light from the external object from the tip to the color sensor.

26. The stylus defined in claim 25 further comprising a texture sensor in the opposing end having a plurality of light sources, a lens, and an image sensor configured to capture images through the lens.

27. The stylus defined in claim 26 further comprising an ambient light sensor configured to measure ambient light color, wherein the control circuitry is further configured to use an ambient light sensor measurement in producing the color sensor measurement on the external object.

28. The stylus defined in claim 25 further comprising an ambient light sensor configured to measure ambient light color, wherein the color sensor is configured to emit light with a light spectrum and wherein the control circuitry is configured to adjust the light spectrum based on an ambient light sensor measurement.

29. The stylus defined in claim 25 wherein the color sensor has a light emitter and a light detector, wherein the elongated housing has a main body between the tip and the end, wherein the color sensor is in the main body, and wherein the light guide structures comprise:
   a first light guide coupled between the light emitter and a first port at the tip; and
   a second light guide coupled between a second port at the tip and the light detector.

* * * * *

UNITED STATES PATENT AND TRADEMARK OFFICE
CERTIFICATE OF CORRECTION

PATENT NO. : 11,550,408 B1  
APPLICATION NO. : 17/361144  
DATED : January 10, 2023  
INVENTOR(S) : Jean Hsiang-Chun Lu et al.

Page 1 of 1

It is certified that error appears in the above-identified patent and that said Letters Patent is hereby corrected as shown below:

In the Specification

Column 16, Line 41, "target 104." should read -- target 106. --

In the Claims

Column 20, Line 43, Claim 29, "elongated housing" should read -- elongated stylus housing --

Signed and Sealed this
Fourth Day of April, 2023

Katherine Kelly Vidal
*Director of the United States Patent and Trademark Office*